Dec. 15, 1959   D. B. FITZGERALD   2,917,157
CONVEYOR APPARATUS
Filed Dec. 16, 1957   2 Sheets-Sheet 1

Inventor
DEAN B. FITZGERALD
By Oscar L. Spencer
Attorney

Dec. 15, 1959   D. B. FITZGERALD   2,917,157
CONVEYOR APPARATUS
Filed Dec. 16, 1957   2 Sheets-Sheet 2
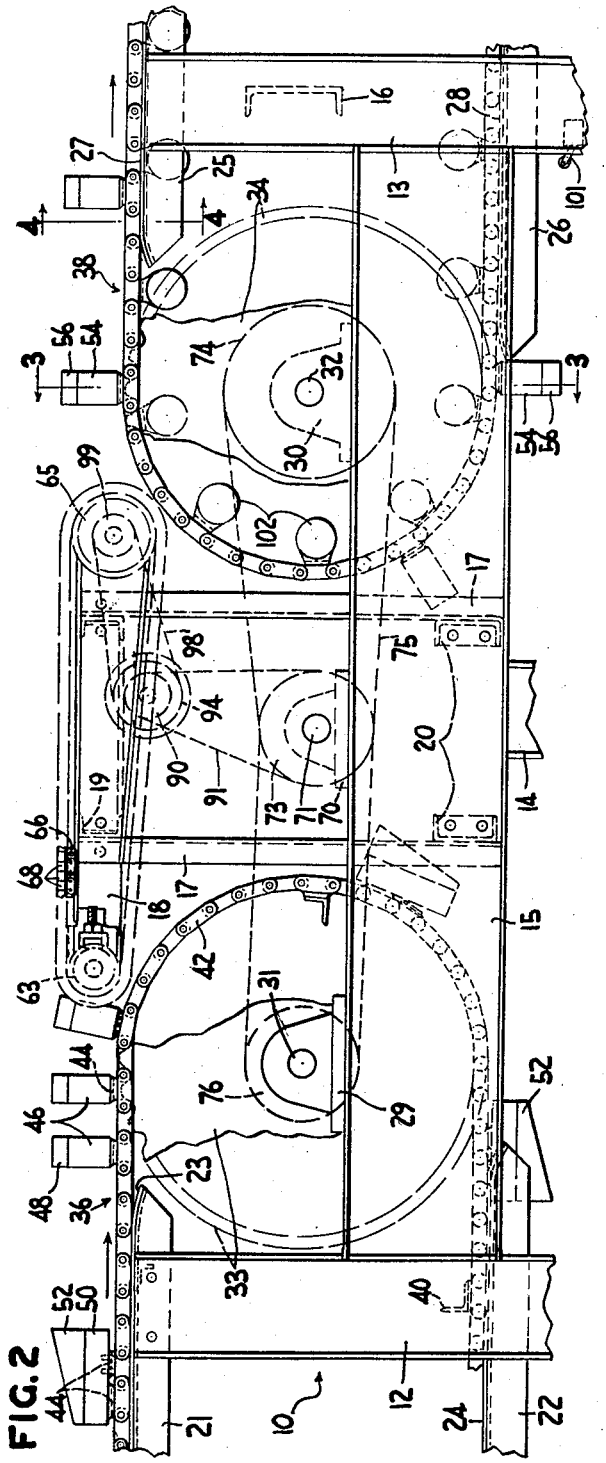
INVENTOR.
DEAN B. FITZGERALD
BY Oscar H. Spencer
ATTORNEY United States Patent Office 2,917,157
Patented Dec. 15, 1959

2,917,157

CONVEYOR APPARATUS

Dean B. Fitzgerald, Crystal City, Mo., assignor to Pittsburgh Plate Glass Company, Allegheny County, Pa., a corporation of Pennsylvania Application December 16, 1957, Serial No. 703,114

6 Claims. (Cl. 198—34)

This invention relates to apparatus for preparing and laminating a composite assembly of two glass sheets and a thermoplastic interlayer.

In the preparation of a curved laminate having two matched curved glass sheets and a thermoplastic interlayer bonded to the glass sheets, such as a curved windshield, a pair of matched curved glass sheets is prepared. This is done conventionally by bending the two glass sheets to provide the matching relationship. To prepare the composite assembly the glass sheets are separated and placed on different supports of a moving conveyor with the ends of each curved glass sheet pointing downwardly. The support for the outer curved glass sheet follows the support for the inner curved glass sheet. At an assembly station the thermoplastic sheet is placed on the inner glass sheet on its moving support. The outer glass sheet is lifted from its support and placed on the thermoplastic sheet to complete the composite assembly. The method and apparatus are disclosed and claimed in assignee's copending application Serial No. 667,262 entitled "Method and Apparatus for Preparing Composite Assembly" and filed by Earl R. Smith and Harry L. Ziegler on June 21, 1957.

An improved apparatus for conveying the separate pair of curved glass sheets to the assembly station and conveying the resulting composite assembly from the assembly station is disclosed and claimed in a patent application entitled "Apparatus for Preparing Composite Assembly" being filed by LeRoy S. Whitmire and executed on the same date as this application. The apparatus has two types of sets of supports mounted on a pair of chains that are moved through a cyclic path including a top horizontal run. The two types of sets of supports are mounted around the chains so one of the second type follows every set of the first type.

An inner glass sheet of the separated pair of matched curved sheets is placed on a set of supports of the first type with the ends of the sheet pointing downwardly and with the longitudinal axis of the sheet transverse to the direction of travel of the chains. The outer glass sheet is placed on a set of supports of the second type that follows and is supported with the ends pointing downwardly and with the longitudinal axis of the sheet transverse to the direction of travel of the chains. After placing the thermoplastic sheet on the inner glass sheet the outer glass sheet is lifted from its set of supports and placed on the thermoplastic sheet as described above. With this apparatus composite assemblies are produced on sets of supports of the first type separated by a set of supports that are used for supporting and conveying the outer glass prior to the placing of it on the thermoplastic sheet.

Recently apparatus have been developed for use in the laminating of the composite assembly. The apparatus has a conveyor which moves the composite assemblies through a lehr or oven to heat them. In these apparatus the air is removed from between the plastic sheet and the glass sheets by providing a vacuum around the edge of the assembly before the assembly is moved into the oven. The vacuum is maintained while passing the composite assemblies through the oven. This treatment, while being moved by the apparatus, bonds at least the marginal portion of the thermoplastic sheet to the glass sheets. Apparatus of this type including a continuous evacuating mechanism for providing a vacuum and for maintaining the vacuum between the thermoplastic sheet and the glass sheets while conveying the composite assemblies through an oven is disclosed and claimed in a patent application entitled "Apparatus for Laminating" executed this date by me. The resulting assembly is subjected to treatment of elevated temperature and pressure to complete the bonding of the thermoplastic sheet to the two glass sheets.

My apparatus for conveying the composite assemblies through an oven for laminating supports the composite assemblies with the ends pointing downwardly. Each composite assembly is on a set of supports mounted on a pair of chains that move the composite assembly along the horizontal top run of the chains and part of this top run is through the oven. The composite assemblies are moved through the oven that has temperature zones, for example, of 270, 300 and 340° F., at a speed to heat the outer glass surfaces of the composite assembly to about 230° F. Vacuum tanks are also mounted to the supporting structure and are in communication with continuous channel members that are placed around the composite assemblies with their flanges abutting the marginal outer surfaces of the assemblies to evacuate air from between the thermoplastic sheet and the two glass sheets. The vacuum maintained in the tanks is a minimum of about 20 in. of mercury.

The speed of the chains is chosen so that the composite assemblies have a sufficient residence time in the oven to adequately heat the assembly for at least marginal bonding of the thermoplastic sheet to the glass sheets. The sets of supports of this apparatus are placed as close together as is reasonably possible to provide the maximum utilization of the conveyor apparatus and the oven. This distance between the sets of supports is considerably shorter than the distance between the sets of the first type of supports in the assembly apparatus described above.

It is an object of the present invention to provide an apparatus including a conveyor for preparing a composite assembly of two glass sheets and a thermoplastic interlayer, a conveyor for moving the assembly while evacuating and heating it to bond the thermoplastic sheet to the glass sheets and a conveyor for transferring, on a continuous automatic basis, composite assemblies from the first conveyor to the second conveyor.

This and other objects of the present invention will be apparent to one skilled in the art from the description that follows of a preferred embodiment of the apparatus when taken in conjunction with the drawings in which like parts are designated by the same numeral and in which:

Fig. 2 is an elevation of the apparatus;

Fig. 3 is a cross section taken along the line 3—3 of Fig. 2; and

Fig. 4 is an enlarged fragmentary cross section taken along the line 4—4 of Fig. 2.

Figure 1:
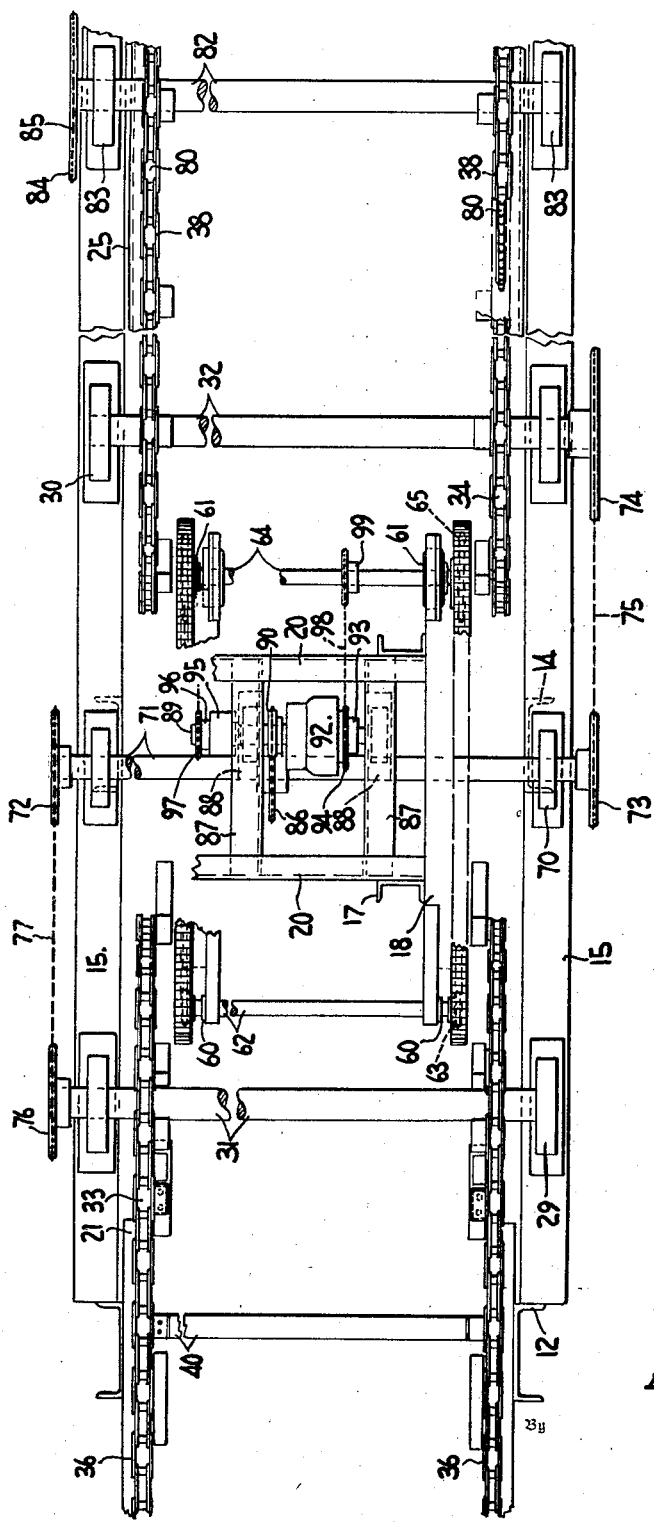
Fig. 1 is a plan view of the apparatus with parts removed.

The apparatus has a supporting structure generally indicated at 10 and includes two rows of upright channel irons 12, two rows of upright channel irons 13 and a pair of upright channel irons 14. The supporting structure 10 also includes a pair of horizontal channel irons 15 mounted on upright channel irons 14 and secured to adjacent upright channel irons 12 and 13. The supporting structure 10 has horizontal transverse channel irons 16, each secured to an upright channel iron 13 of each row. Similar horizontal transverse channel irons (not shown) are connected to the two rows of channel irons 12. Mounted to each of horizontal channel irons 15 there is a pair of upright channel irons 17. Each pair of channel irons 17 supports a bearing holder 18. The pairs of channel irons 17 are interconnected by top and bottom horizontal transverse channel irons 19 and 20, respectively.

Channel irons 12 in each row are connected by top and bottom chain supports 21 and 22, respectively. Chain guides 23 are secured on top of supports 21 and chain guides 24 are secured on top of supports 22. Channel irons 13 in each row are connected by top and bottom chain supports 25 and 26, respectively. Chain guides 27 are secured on the top of supports 25 and chain guides 28 are secured on the top of supports 26.

Bearings 29 and 30 are mounted on each of horizontal channel irons 15. The bearings 29 on channel irons 15 rotatably mount a shaft 31. The bearings 30 on channel irons 15 rotatably mount a shaft 32. Between bearings 29 a pair of sprockets 33 is keyed on shaft 31. Between bearings 30 a pair of sprockets 34 is keyed on shaft 32.

A pair of chains 36 engage sprockets 33 and are supported by top chain guides 23 and bottom chain guides 24. Similarly a pair of chains 38 engage sprockets 34 and are supported by top chain guides 27 and bottom chain guides 28.

A number of spacer angle irons 40 are joined at their ends to flanged links 42 of chains 36. Some of the links 42 have horizontal top flanges 44 on which are secured supports 46. Resilient, such as rubber, supports 48 are secured on top of supports 46. The supports 48 on supports 46 are mounted on chains 36 to provide sets of supports 48 on each of the chains 36. In a set the supports 48 on one chain 36 are opposite supports 48 on the other chain 36. The supports 48 of each set are positioned so that it supports the composite assembly at transversely spaced areas between its center and downwardly extending ends. In the illustrative embodiment the set of supports 48 has three spaced apart supports 48 on each chain 36.

Between each set of supports 48 on each chain 36 there are two spaced apart pairs of adjacent links 42, each having a top horizontal flange 44. Secured on flange 44 of one link 42 of each pair is a support 50 on which is secured a resilient, such as rubber, support 52. Each support 50 rests on flange 44 of adjacent link 42 when support 50 is being moved in a horizontal top run of chains 36. With this construction there is provided sets, each of four supports 52, alternately arranged with sets of support 48 around chains 36.

Supports 48 preferably have parallel top surfaces and on each chain 36 supports 48 of a set are sufficiently close to each other to support the curved composite assembly inwardly of its margin. The supports 52 have glass-sheet-supporting top surfaces that are inclined. For each set of pair of supports 52 on each chain 36 between the sets of supports 48, the inclined top surfaces of supports 52 face each other.

Mounted on chains 38 are supports 54 with supports 56 thereon to provide sets of supports 56, each set being arranged to support a composite assembly in the same manner as supports 48 on chains 36. However, the spacing between sets of supports 56 along chains 38 is substantially less than the spacing between sets of supports 48 on chains 36, because the latter sets of supports 48 are separated from one another by the sets of supports 52. In an illustrative embodiment the distance between the centers of the sets of supports 56 along chains 38 is 40 inches whereas the different distance between the center lines of the sets of supports 48 along chains 36 64 inches. The ratio of these distances is, therefore, 5 to 8.

Each of bearing holders 18 supports a bearing 60 and a bearing 61. The bearing 60 is adjustably positioned on bearing holder 18. The bearings 60 rotatably mount a shaft 62 on which are keyed a pair of sprockets 63. The bearings 61 rotatably mount a shaft 64 on which are keyed a pair of sprockets 65. A pair of chains 66 engage sprockets 63 and sprockets 65. The top run of chains 66 is supported on bearing holders 18. The tension of the top run of chains 66 is adjusted by the adjustment of bearings 60 which are slidably mounted in guides at one end of each of bearing plates 18.

The chains 66 have top horizontally flanged links on which are secured resilient, such as rubber, support blocks 68 and in the preferred construction, as shown, the resilient blocks 68 are mounted on each of the links of the chains 66.

A pair of bearings 70 is mounted on horizontal channel irons 15 and bearings 70 rotatably mount a shaft 71 on one end of which is keyed a sprocket 72. At the other end of shaft 71 is keyed a sprocket 73. On one end of shaft 32 is keyed a sprocket 74 in alignment with sprocket 73 on shaft 71. A chain 75 engages sprockets 73 and 74. On one end of shaft 31 is keyed a sprocket 76 in alignment with sprocket 72 on shaft 71. A chain 77 engages sprockets 72 and 76.

At the right-hand end of the apparatus, as viewed in Fig. 1, a pair of sprockets 80 engaged by chains 38 is keyed on a shaft 82 rotatably mounted by bearings 83 to the supporting structure 10. One end of shaft 82 has a sprocket 84 that is keyed on it and is engaged by a chain 85 driven by a motor means (not shown). With this construction the motor means through sprockets 80 drives chains 38 through their cyclic path. The chains 38 rotate sprockets 34 and thereby shaft 32 so that sprocket 74 is rotated to drive sprocket 73 on shaft 71. The shaft 71 through sprocket 72, chain 77 and sprocket 76 rotates shaft 31 to drive chains 36 through their cyclic path.

A sprocket 86 is keyed on shaft 71 between sprockets 72 and 73. A pair of channel irons 87 is supported by channel irons 20 between bearing holders 18. A pair of bearings 88 is supported by channel irons 87 and rotatably mount a shaft 89 on which is keyed a sprocket 90 engaged by a chain 91 that is driven by sprocket 86. An electric clutch 92 is mounted on shaft 89 and driven clutch member 93 of electric clutch 92 has mounted on it a sprocket 94. An overrunning cam clutch 95 is also mounted on shaft 89 and the outer race 96 of clutch 95 has keyed on it a sprocket 97. With this arrangement rotation of shaft 89 by rotation of sprocket 90 rotates sprocket 97 but only rotates sprocket 94 when electric clutch 92 is energized.

The sprocket 94 engages a chain 98 that engages one of a pair of sprockets 99 keyed on shaft 64. The sprocket 97 engages a chain 100 that engages the other sprocket 99. The sprockets 99 and sprockets 94 and 97 have diameters so that sprocket 97 through sprocket 99 and chain 100 rotates shaft 64 at a particular revolution per minute and sprocket 94 on electric clutch 92 through chain 98 and sprocket 98 rotates shaft 64 when clutch 92 is energized at a substantially higher revolution per minute.

The sprockets 72, 73, 74 and 76 have diameters so that chains 36 operate at a faster speed than chains 38. In the illustrative embodiment where the spacings between centers of the sets of supports mounted to chains 38 are 40 inches and the distances between the centers of the sets of supports of the same type mounted on chains 36 are 64 inches, the foregoing sprockets have diameters so that the speed ratio to chains 36 to chains 38 is 8 to 5.

In this preferred embodiment the faster speed of chains 66 is provided by energization of electric clutch 92 and is a speed substantially equal to that of chains 36. The slower speed, that is provided by overrunning clutch 95 when electric clutch 92 is not energized, is in this case approximately the speed of chains 38.

The electric clutch 92 is energized only part of the time. Alternately the chains 66 are driven by the overrunning clutch 95. In the preferred embodiment the electric clutch 92 is energized by the tripping of a switch 101 mounted to the supporting structure 10 and tripped by the leading support 56 of each set on one of chains 38 near the end of its movement in the bottom run of its cyclic path. The switch 101 can be in series with a coil (not shown) of a time-delay relay (not shown) to close a pair of contacts of the relay that are in series with the electric clutch. In this case the relay is adjusted so that the contacts will remain closed an adjustable period of time after switch 101 is tripped by the leading support 56. During this period of time the other supports 56 of a set will trip switch 101 but will be ineffective, because the contacts in series with the electric clutch are already closed. In an alternate embodiment a second switch can be placed to be tripped by the leading support 56 of each set on one of the chains 38. In this arrangement the first switch 101 is in series with the coil of a relay. The holding circuit for the relay includes the second switch and the tripping of that switch, normally closed, opens the holding circuit to deenergize the coil of the relay thus deenergizing the electric clutch 92. It is apparent that the spacing between this pair of switches will determine the length of time that electric clutch 92 drives shaft 64 through sprockets 94 and 99 and chain 98.

The length of time that chains 66 operate at the higher speed is dependent upon the length of the conveyor provided by chains 66, the relative spacings of sets of supports 48 and sets of supports 56 on chains 36 and 38, respectively, the ratio between the speeds of chains 36 and chains 38, and the actual speeds of chains 66 provided alternately by electric clutch 92 and overrunning clutch 95. The length of time for the high speed of chains 66 provided by electric clutch 92 is also dependent upon the transverse dimension of the curved composite assembly, because the higher speed is operated for chains 66 from a time just before a curved composite assembly is loaded onto support blocks 68 until the composite assembly has been completely transferred from a set of supports 48 onto supports 68 of chains 66. From that point on until the composite assembly is loaded onto a set of supports 56 on chains 38 the chains 66 operate at the lower speed. It is not necessary that the two speeds of chains 66 coincide with the speeds of chains 36 and chains 38. For example, in one application of the apparatus the chains 36 operated at 15 feet per minute and chains 38 moved at 9.6 feet per minute whereas the two speeds of chains 66 were 11.5 feet per minute and 7.5 feet per minute.

Furthermore, with certain patterns it has been possible to satisfactorily transfer curved composite assemblies from sets of supports 48 on chains 36 to sets of supports 56 on chains 38 by means of supports 68 on chains by using only the overrunning clutch 95 to drive chains 66. In other words, the electric clutch 92 was not operated. In this case the chains 66 were operated at the speed of chains 38. When a glass assembly was being loaded by moving a set of supports 48 of chains 36 onto supports 68 on chains 66, the chains 66 were moved faster than driven by overrunning clutch 95 due to the movement of the composite assembly unto supports 68. The overrunning clutch 95 permitted this faster movement of chains 66. The faster movement continued until the composite assembly was completely transferred. Then the clutch 95 resumed the drive of chains 66.

In any application of the apparatus of the invention the various interrelated factors of speed of chains 36, 38 and 66, the spacings between sets of supports 48 and sets of supports 56, the length of the top run of supports 68 provided by chains 66 and the time of operating chains 66 at a higher speed are considered in the final design so that the composite assembly transferred from a set of supports 48 onto supports 68 of chains 66 are transferred from or moved off the other end of the transfer conveyor including chains 66 at the proper moment to be supported by a set of supports 56 moving into position to start their top horizontal run.

The flanges 102 of the ends of vacuum tanks 103 are secured to bottom horizontal flanges 104 of some links 42 of chains 38. The construction of vacuum tanks 103 are fully disclosed in my copending application mentioned above.

The continuous evacuating mechanism that is disclosed and claimed in my copending application is not shown in the drawings of the present application. If shown the mechanism including its manifold would be mounted on shaft 32 or shaft 82 or both.

The foregoing description has been presented merely for purpose of illustration of the preferred embodiment. Various modifications to the apparatus will be apparent to one skilled in the art. The invention is limited only by the claims which follow.

I claim:

1. An apparatus for conveying curved glass-plastic-glass assemblies spaced apart a predetermined distance through a first zone and spaced apart a shorter distance through a second zone which comprises first and second conveyor means for moving said assemblies through said first and second zones at said distances of spacing between assemblies, means for operating said first conveyor to move said assemblies at a first velocity, means for operating said second conveyor means to move said assemblies at a slower velocity than provided on said first conveyor by said first operating means, third conveyor means for moving said assemblies from said first conveyor means to said second conveyor means, means for operating said third conveyor means at alternate speeds.

2. The apparatus of claim 1 wherein said means for operating said third conveyor means at alternate speeds moves said assemblies on said third conveyor means first at the speed of the first conveyor means and then at the speed of the second conveyor means.

3. An apparatus for conveying curved glass-plastic-glass assemblies spaced apart a predetermined distance through a first zone and spaced apart a shorter distance through a second zone which comprises first sets and second sets of means for supporting said assemblies, first and second conveyor means for moving and supporting said first and second sets, each in a cyclic path including a top horizontal portion, each of said sets including a pair of supports spaced transversely from each other to be moved in parallel planes by one of said conveyor means, each set of said first sets of assembly support means being spaced on said first conveyor means around their cyclic path by a predetermined distance from adjacent sets and each set of said second sets of assembly support means being spaced on said second conveyor means around their cyclic path by a distance from adajcent sets shorter than said predetermined distance, means for operating said first and second conveyor means to move in their cyclic path said first sets faster than said second sets of assembly support means, a third conveyor means between said first and second conveyor means and including a transversely spaced parallel pair of supports in planes parallel to said planes of movement of said first and second sets of support means, and means for moving said supports of the third conveyor alternately at the speeds of the first and second sets of support means.

4. An apparatus for conveying curved glass-plastic-glass assemblies spaced apart a predetermined distance through a first zone and spaced apart a shorter distance through a second zone which comprises a supporting structure, a first conveyor including a first pair of chains, first sprockets driving said chains and first sets of supports mounted to said pair of chains, each first set of supports providing for support of one assembly through said first zone, means mounted to the supporting structure for supporting said first pair of chains horizontally through the first zone toward the second zone, a second conveyor including a second pair of chains, second sprockets and third sprockets, said third sprockets driving said second pair of chains, and second sets of supports, each second set of supports being mounted to said second pair of chains to support one assembly through the second zone, means for supporting said second pair of chains horizontally through the second zone, means for rotating said first and third sprockets to move said first pair of chains at a velocity greater than the velocity of the second pair of chains, said second sets of supports being spaced apart a shorter distance than the distance between the first sets of supports, and a third conveyor including a third pair of chains, a shaft rotatably mounted to the supporting structure, fourth sprockets engaged by said third pair of chains, fifth sprockets mounted on the shaft and engaged by and driving said third pair of chains, and substantially continuous means mounted on said third pair of chains for supporting said assemblies and conveying said assemblies from said first conveyor to said second conveyor, means for rotating said shaft and fifth sprockets alternately at two different speeds to provide alternate velocities for the third pair of chains, said third pair of chains being in different parallel planes than said first and thirid parallel planes.

5. The apparatus of claim 4 wherein the means for rotating said shaft and fifth sprockets includes sixth sprockets mounted on said shaft, an overrunning clutch driving one of the sixth sprockets, an electric clutch driving the other sixth sprocket, and means for operating said clutches including a second shaft rotatably mounted to the supporting structure and driving said clutches, means for rotating said second shaft and operatively engaged by said second conveyor, actuated means for energizing said electric clutch and mounted to be actuated by said second sets of supports.

6. The apparatus of claim 5 wherein said means for rotating said fifth sprockets alternately at two different speeds moves said third pair of chains alternately at velocities substantially equal to the two velocities of the first and second pairs of chains.

References Cited in the file of this patent

UNITED STATES PATENTS

| 722,937 | Begg | Mar. 17, 1903 |
| 2,866,534 | Carter | Dec. 30, 1958 |

FOREIGN PATENTS

| 747,317 | Great Britain | Apr. 4, 1956 |